(12) United States Patent
Hayden (10) Patent No.: US 11,037,209 B2
(45) Date of Patent: Jun. 15, 2021

(54) PERSONAL ADVISOR RATINGS

(71) Applicant: Robert M. Hayden, New York, NY (US)

(72) Inventor: Robert M. Hayden, New York, NY (US)

( * ) Notice: Subject to any disclaimer, the term of this patent is extended or adjusted under 35 U.S.C. 154(b) by 1372 days.

(21) Appl. No.: 15/013,543

(22) Filed: Feb. 2, 2016

(65) Prior Publication Data
US 2016/0225039 A1    Aug. 4, 2016

Related U.S. Application Data

(60) Provisional application No. 62/111,120, filed on Feb. 3, 2015.

(51) Int. Cl.
*G06Q 30/02*    (2012.01)
*G06Q 30/00*    (2012.01)
*G06Q 40/06*    (2012.01)

(52) U.S. Cl.
CPC ..... *G06Q 30/0282* (2013.01); *G06Q 30/0185* (2013.01); *G06Q 40/06* (2013.01)

(58) Field of Classification Search
None
See application file for complete search history.

(56) References Cited

U.S. PATENT DOCUMENTS 5,740,388 A * 4/1998 Hunt ............ G06Q 30/06 360/74.1
6,233,568 B1 * 5/2001 Kara ............ G01G 19/005 705/401
2002/0035488 A1 * 3/2002 Aquila ............ G06Q 40/02 705/4
2002/0174110 A1 * 11/2002 Smith ............ G06Q 30/02
2008/0255984 A1 * 10/2008 Millstone ............ G06Q 30/08 705/38

(Continued)

OTHER PUBLICATIONS

Matt Koppenheffer, ""So Many Hidden Numbers"": How Advisors Give Their Clients the Vampire Treatment", https://www.fool.com/investing/general/2012/05/11/so-many-hidden-numbers-how-advisors-give-their-cli.aspx (May 11, 2012) (Year: 2012).*

(Continued)

*Primary Examiner* — Paul R Fisher
(74) *Attorney, Agent, or Firm* — Panitch Schwarze Belisario & Nadel LLP (57) ABSTRACT

A direct-to-consumer financial advisor rating system has a website in electronic communication with a server and is provided on a subscription basis. The server includes a scorer which retrieves a first rating, a second rating, and a third rating upon receiving a search request for an advisor, the first rating quantifying the advisor's qualifications and expertise, the second rating quantifying the advisor's communication, work flexibility and performance skills, the third rating quantifying the advisor's ethics and independence from conflicts. The scorer uses the first, second and third ratings to calculate an overall rating score for the advisor, the overall rating score shown as a single number and representing a comprehensive analysis of a quality of the advisor, the overall rating score providing a measure with which to benchmark the advisor against other advisors. The website displays the overall rating score to the user who made the search request.

15 Claims, 5 Drawing Sheets

(56) References Cited

U.S. PATENT DOCUMENTS

| | | | | |
|---|---|---|---|---|
| 2012/0158465 A1* | 6/2012 | Golembiewski | ........ | G06Q 10/06 705/7.42 |
| 2013/0151589 A1* | 6/2013 | Eden | ........ | H04L 67/20 709/203 |
| 2013/0304573 A1* | 11/2013 | Pinhas | ........ | G06Q 30/0282 705/14.53 |
| 2014/0101735 A1* | 4/2014 | Drenkard | ........ | G06Q 10/105 726/6 |
| 2014/0288951 A1* | 9/2014 | Zielinski | ........ | G06Q 10/10 705/2 |
| 2014/0308648 A1* | 10/2014 | Jain | ........ | G09B 7/02 434/362 |
| 2015/0317604 A1* | 11/2015 | Bubna | ........ | G06Q 10/1053 705/321 |
| 2015/0356643 A1* | 12/2015 | Kohm | ........ | G06Q 30/0282 705/347 |
| 2016/0267505 A1* | 9/2016 | Murphy | ........ | G06Q 30/0282 |

OTHER PUBLICATIONS

NAPFA, "The National Association of Personal Financial Advisors", https://web.archive.org/web/20130306110914/http://www.napfa.org/about/FiduciaryOath.asp (Mar. 6, 2013) (Year: 2013).*

TripAdvisorWatch, "How to Fake TripAdvisor Reviews", https://tripadvisorwatch.wordpress.com/2011/11/08/how-people-fake-tripadvisor-reviews/ (Nov. 8, 2011) (Year: 2011).*

Betterment: why-betterment. Mar. 30, 2016. <https://www.betterment.com/why-betterment/>.

EMoneyAdvisor:Products. Mar. 30, 2016. <http://www.emoneyadvisor.com/Products>.

Mint: How it works. Mar. 30, 2016. <https://www.mint.com/how-mint-works>.

Wealthfront: what-we-do. Mar. 30, 2016. <https://www.wealthfront.com/what-we-do>.

\* cited by examiner

PERSONAL ADVISOR RATINGS

CROSS-REFERENCE TO RELATED APPLICATIONS

This patent application claims the benefit, under 35 U.S.C. 119(e), of U.S. Provisional Patent Application Ser. No. 62/111,120, filed on Feb. 3, 2015, the content of which is incorporated herein by reference in its entirety.

FIELD OF THE INVENTION

The present teachings relate generally to systems and methods for providing online personal financial reports, analytical tools, educational information, financial advisor ratings and/or financial advice.

BACKGROUND OF THE INVENTION

Financial-related websites are known. For example, sites such as www.Mint.com, www.Betterment.com and www.Wealthfront.com capture a portion of an individual's total financial picture and provide some limited analysis. Sites such as www.eMoneyAdvisor.com offer additional analysis but are only made available to the consumer through an investment advisor and generally conditioned upon the consumer's continued use of that investment advisor. Due to lower cost, on-demand efficiency, ability to handle multi-variable complex mathematical analysis, greater comfort with online forums and a general distrust of conflict-ridden and unreliable advice of inadequately-trained human advisors, financial-related sites are growing in demand by consumers—either instead of or in addition to consumer's use of a human advisor.

Known financial-related websites have a number of deficiencies. One of those deficiencies includes the failure to provide objective, or substantially objective, measures and ratings of financial advisors so that people (e.g., clients) can assess the extent of fees that should be paid to an advisor and whether such fees are reasonable in view of the quality/level of service rendered by the advisor. Thus, what is needed is a web-based, direct-to-consumer system which provides comprehensive monitoring and independent analysis of financial advisors. What is also needed is a system that generates an objective, or substantially objective, measure that would allow users to benchmark one financial advisor against another. What is also needed is a system that enables users to rate one or more performance aspects of the financial advisor(s) and to review other users' experiences with advisors. Such system and method would give users some measure by which to evaluate a financial advisor's qualifications and ability to deliver value as well as to assess the extent of fees that should be paid to that advisor.

SUMMARY OF THE INVENTION

The needs set forth herein as well as further and other needs and advantages are addressed by the present embodiments, which illustrate solutions and advantages described below.

An objective of the present teachings is to remedy the above problems associated with known financial-related websites.

The present teachings provide for, but is not limited to, a direct-to-consumer comprehensive financial advisor rating system. The system has a storage and a website in electronic communication with a server. The server has an interface including computer instructions executing on computer hardware, the interface only allowing a plurality of users at user terminals access to the system if they have paid for a subscription to the system. The server also has a scorer, which includes computer instructions executing on computer hardware. The scorer retrieves a first rating, a second rating, and a third rating upon receiving a search request for an advisor from one of the plurality of users at one of the user terminals. The first rating quantifies the advisor's qualifications and expertise, the second rating quantifies the advisor's communication, work flexibility and performance skills, the third rating quantifies the advisor's ethics and independence from conflicts. The scorer uses the first, second and third ratings to calculate an overall rating score for the advisor, wherein the overall rating score is shown as a single number and represents a comprehensive analysis of a quality of the advisor, the overall rating score providing a measure with which to benchmark the advisor against other advisors. The scorer transmits the overall rating score to the storage in order to be saved. The website further displays the overall rating score to the one of the plurality of users on the one of the user terminals after being allowed access to the system by the interface.

This system was derived from feedback the advisors at Total Alignment Wealth Advisors, LLC received from its clients, as well as feedback from students in classes taught by its Chief Wealth Advisor, as to what is universally important about clients' personal financial advisors. The comments and feedback received are classified into three areas: (1) strong qualifications and expertise, measured objectively by general education, specialized education and years of experience, (2) solid communication and performance, measured subjectively and on a comparative basis by clients of that advisor or independent intermediary advisor who interact regularly with that advisor, and (3) independence, measured objectively based upon the avoidance of structural incentives that may cause the advisor to recommend a solution that may not be in the client's best interests.

The present teachings also include a method of providing direct-to-consumer analysis and rating of a financial advisor. The method comprises the steps of: providing a storage; providing a website in electronic communication with a server; allowing a plurality of users at user terminals access to the system only if they have paid for a subscription to the system; and retrieving via the server a first rating, a second rating, and a third rating upon receiving a search request for an advisor from one of the plurality of users at one of the user terminals, the first rating quantifying the advisor's qualifications and expertise, the second rating quantifying the advisor's communication, work flexibility and performance skills, the third rating quantifying the advisor's ethics and independence from conflicts. The method further comprises the steps of storing the first rating, second rating and third rating in the storage; using a scorer to calculate an overall rating score for the advisor based on the first rating, second rating, and third rating; transmitting the overall rating score from the scorer to the storage to be saved; and displaying the overall rating score to the one of the plurality of users on the one of the user terminals after being allowed access to the system.

Other embodiments of the system and method are described in detail below and are also part of the present teachings.

Other features and aspects of the invention will become apparent from the following detailed description, taken in conjunction with the accompanying drawings, which illustrate by way of example, the features in accordance with embodiments of the invention. The summary is not intended to limit the scope of the invention, which is defined solely by the claims attached thereto.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

In view of prior art, there is a lack of tools available that offer objective, or substantially objective, analysis and comparison of financial advisors across different financial management companies. Therefore, it is desirable to provide a comprehensive advisor rating system or tool over the Internet to the public so that users may conduct a search of a financial advisor and obtain a fast, objective evaluation of the advisor and the advisor's fees. It is desirable that such tool also assesses the performance of assets managed by the advisor relative to the performance of assets managed by other advisors. Consumers want on-demand comprehensive financial advisor ratings and analysis, which existing tools fail to provide.

It is also desirable to provide a financial advisor rating system or tool that is accessible in a web-based database and subject to review for and by users who are in need of services of an advisor and require means to objectively evaluate such advisor. The financial advisor rating tool generates comparative information about current and/or prospective advisors and provides users with such information.

It is further desirable to provide a financial advisor rating system or tool that gives recommendations and insights as to choice of financial advisors, determines a reliable scoring mechanism to generate an aggregate ranking of financial advisors, and display data visualizations for users to quickly understand the assessment of the advisor.

A system or tool according to the present teachings not only achieves the above objectives, but it provides recommendations that users have been seeking and provides each user a survey/questionnaire to assess their current advisor. The system or tool may also be configured with special subscription add-on browsing capabilities for certain aspects, such as third-party reviews of financial advisors (which are more detailed than a simple star-based system) that is based upon independence, ethics, performance, expertise, education, experience (e.g., may be based upon a scoring system calculating a score weighted at, for example, 30% on advisor's qualifications and expertise, 30% on advisor's communication, flexibility and performance, 40% on advisor's incentives, independence and ethics).

While receiving the above information is one reason why the user/consumer subscribes to the financial advisor rating system or tool, the system also shows the user how the rating of one advisor compares with the ratings of other advisors in their local area. In some embodiments, the system may be configured to compare the ratings of advisors who have clients with similar income bracket and/or net worth level as the user (but is not limited thereto).

Since known personal financial management companies rely heavily on contractual relationships with advisors, incorporating comparative insights about advisors' fees and performance, as is the case with the present invention, provides both a uniquely valuable service to users and a clear competitive advantage that existing companies are prevented from providing due to conflict. The collection of this information is not available in the prior art. Accordingly, this comparative analysis is a new technical solution made available by the present technology.

A system or tool according to the present teachings is more comprehensive than known tools because it takes into account various core factors about the advisor and assigns different weights thereto. Some of the core factors include, but are not limited to, advisor qualifications, expertise, communication, flexibility, performance, incentives, independence and ethics. These data points lead to a rating or score, which can then be used to provide comparative analytics against other advisors' ratings or scores. Such comparative analysis is not available in prior art systems, particularly one that is direct-to-consumer. Since the consumers/users are providing some advisor information and the remaining information is compiled by an independent third-party, the present system or tool is not corrupted by advisor bias, and allows for neutral evaluation and comparison of advisors. It is known that the personal advice business has suffered from scandals and lack of transparency, so the present teachings attempt to "shine the light" by allowing the user to rate their qualitative experience with a particular advisor based on a number of core factors (e.g., responsiveness, communicating style, expertise, skills, independence, etc.) and to provide quantitative metrics and more detailed information about that advisor—including the fees the user paid and how the user was referred to that advisor.

In some embodiments, the system or tool according to the present teachings may include a comparative analytics tool that pulls in data into particular fields from separate information stores provided by independent advisors. Since it is desirable to deliver consolidated reporting, independent advisors may have such insights, for example, about the performance of outside investment managers, the fees they are paying, and spending data. This is also helpful to feed into the system, aggregate and then report out.

With respect to the advisor's qualifications and expertise, these core factors collectively receive, for example, a weight of 30% in the advisor rating score. Clients feel that it is important that their advisors mastered the subjects upon which they are advising. As such, factors such as education level attained, attaining the highest or most respected credentials in their fields and having a sufficient amount of experience (generally defined as at least 10 years in the advisor's respective field) are considered. For some embodiments, in calculating an advisor rating, up to 10 points are earned per year of experience, up to 10 points are earned for the highest and most rigorous voluntary credential in the field, up to 5 points for an undergraduate education, and up to 5 points for a relevant graduate degree. Based on public recognition and rigor of credentials, it has been determined, for example, that the highest credential for the respective field are as follows:

| Field | Highest and Most Rigorous Voluntary Credential in Field |
|---|---|
| Investment Management | Chartered Financial Analyst (CFA) |
| Accounting | Certified Public Accountant (CPA) |
| Law | Master of Laws (LLM) |
| Property & Casualty Insurance | Chartered Property & Casualty Underwriter (CPCU) |
| Life Insurance | Chartered Life Underwriter (CLU) |

With respect to an advisor's communication, flexibility, and performance, these core factors collectively receive, for example, a weight of 30% in the advisor rating score. These factors are often referred to as "soft skills" and include factors such as diligence, ability to empathize, flexibility, work ethic, responsiveness, follow up, ability to work within a team structure, organizational skills, and overall positive outlook. This category of the advisor rating also includes the client's impressions of the outcome—whether it is investment performance (in the case of an investment manager), thoroughness and speed for estate settlement (for an estate attorney) or the like. This category will be based on average user feedback rating within a database as to his or her impressions of the overall client-advisor experience. This is the only subjective measurement portion of the advisor rating score.

With respect to an advisor's incentives, independence and ethics, these core factors collectively receive, for example, a weight of 40%. This category, in some embodiments, carries the heaviest weighting on a theory that the other two attribute categories (i.e., qualifications and expertise; communication, flexibility and performance) are useless if the advisor's advice and assistance is tainted with conflicts of interest and self-interest. Avoidance of disciplinary history with the applicable regulatory body is worth 20 points for example, while being part of a structure (e.g., group, society, firm, company, etc.) that does not accept commissions from third parties nor have a financial interest in the outcome of advice provided is worth the remaining 20 points.

An independent analyst would need to review an advisor's background to obtain and verify the first attribute category (qualifications and expertise) and the third attribute category (incentives, independence and ethics). Such a review is based on publicly-available regulatory and industry databases. In some embodiments of the present teachings, the regulatory and industry databases are connected directly to the system. In other embodiments, the regulatory and industry databases are connected to the system over a network, such as a wide area network, local area network, metropolitan area network, Internet, or the like.

If a user of the present system or tool has already met with a prospective advisor or has been referred to that advisor, the user can access the system to find more history on the advisor and retrieve the advisor's overall rating score. If that advisor has not been rated with a score, the user can request that an independent analyst research the advisor's background history and supply ratings regarding the first and third categories of core factors in order to generate an overall score for the advisor.

If a user has not yet found and/or engaged an advisor, the user can browse the ratings and score of advisors whom have already been reviewed.

If a user has met with an advisor, the user may input information as to his/her experience with the advisor. For example, the system or tool according to the present teachings may prompt the user to enter feedback regarding interaction with the advisor and provide a rating to the system with respect to the second category of core factors (i.e., communication, flexibility and performance). Another user will be able to browse the first user's experience relative to the second category of core factors, but no overall rating score will be available until the other two categories are supplied to the system by an independent analyst.

By allowing individual user experiences to control only 30% of the overall advisor rating outcome or score, the system is more reliable than prior art systems, which are purely user-input rating systems such as those used by Angie's List™ and Amazon™.

The system or tool may be configured to include security means or controls to prevent user experience inputs by competitors. On such control will be a prompt that requires the user to certify that he or she is not a competitor of the advisor and did in fact engage/employ the advisor.

In some embodiments, the system or tool is configured so that all input and feedback retrieved from users are stored anonymously. Further, the system or tool does not track the user and his/her actions and movement within the system or tool. Both features help prevent complications with disgruntled advisors who received adverse ratings (for example, with respect to the second category of core factors) and a low overall rating score.

A financial advisor rating system or tool according to the present teachings will be useful among, but not limited to, individuals who are comfortable using web-based tools, who may be cost-conscious (e.g., in general or as pertaining to advisor fees), who may desire to compare their current advisor with potential advisors to help determine if they are receiving the best value for the fees paid to their current advisor, who may be busy and desire a single-source, easily-accessible system that prepares and compiles advisor ratings, and/or who do not currently engage the services of a financial advisor but require the assistance of one in personal financial matters. Such a system according to the present teachings serves as a platform from which valuable insight into the quality, performance and value of an advisor can be disseminated.

In some embodiments, the system or tool according to the present teachings is configured so that a user would only have to pay for requesting a first review of an advisor. Subsequently requests for review of the same advisor or different advisors would be free. In other embodiments, the system or tool is configured so that a user would have to pay a subscription before making any requests for advisor review. The subscription may be based on periodic (e.g., monthly, yearly, seasonal) access to the system or tool. Alternatively, the subscription may be based on the number of requests (e.g., 10, 20, 30, etc.) for advisor ratings. In some embodiments, the system or tool may be configured so that all search requests are free. Alternatively, the system or tool may be configured so that a payment must be made for each search that is initiated. Additionally, one or more of the above configurations may be offered at the same time by the system or tool.

Figure 1:
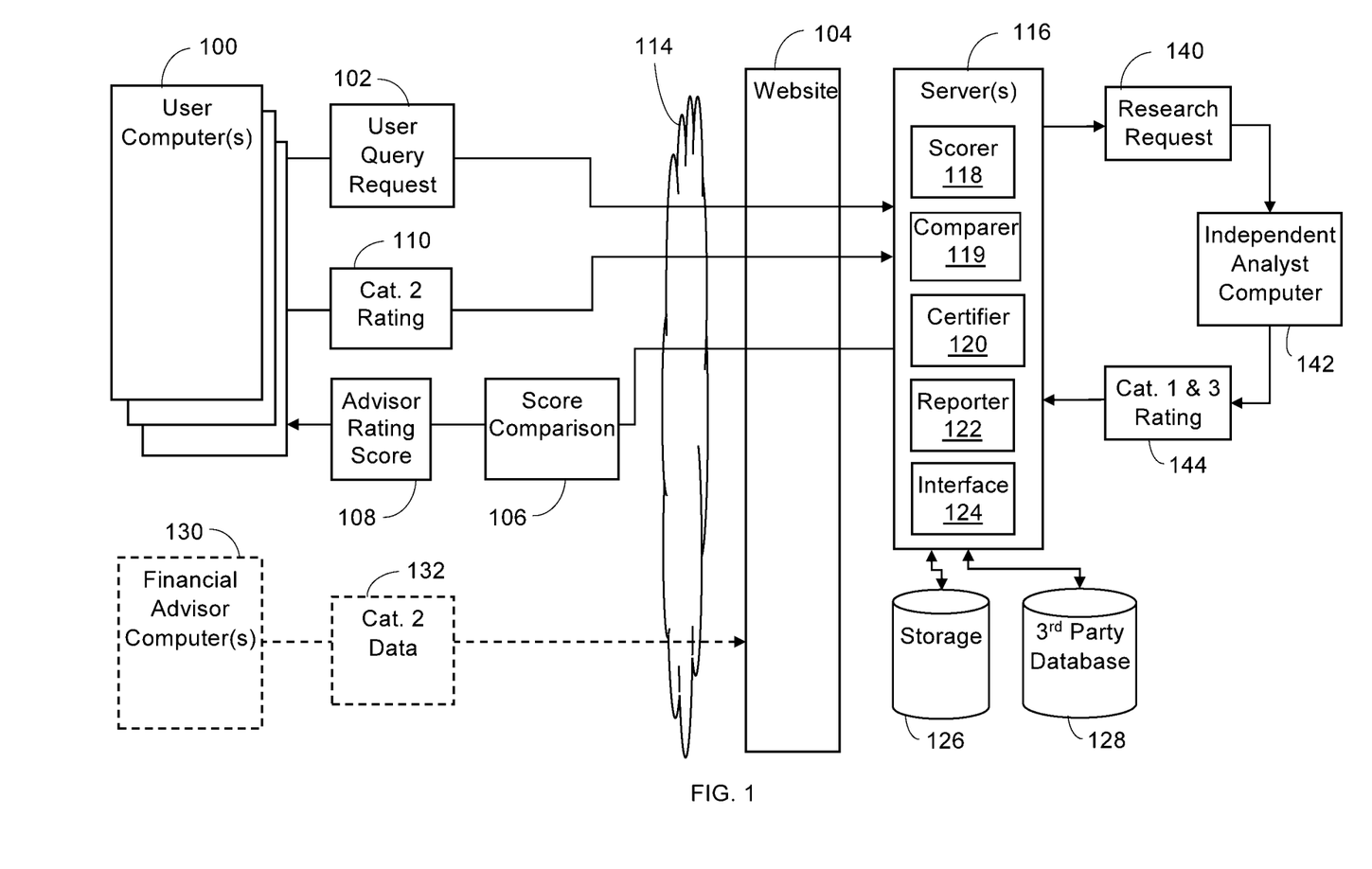
FIG. 1 is a schematic diagram of one embodiment of the system and method according to the present teachings.

Referring now to FIG. 1, shown is a schematic diagram of one embodiment of the system or tool according to the present teachings. The system may comprise a website 104 that allows one or more user computers 100 to interact with one or more servers 116. Using the website 104, a user at a user computer 100 may send a query request 102 for a particular advisor to the server(s) 116 over the Internet 114 and subsequently receive an overall rating score 108 for the requested advisor (if available) and score comparison information 106. The score comparison information may include a comparative analysis of the requested advisor's overall score relative to the scores of other advisors (for example, other advisors in the same geographical area).

Figure 2:
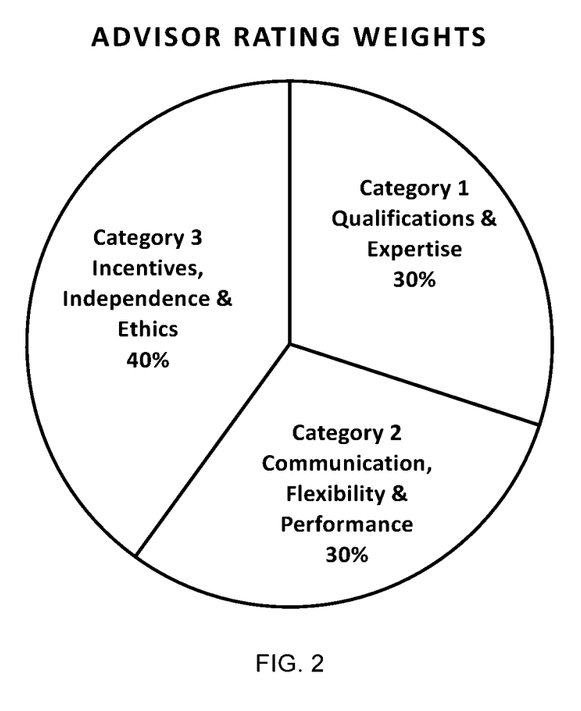
FIG. 2 is a pie chart showing the weight each factor receives in generating an overall rating score for an advisor using the system and method of FIG. 1.

The server(s) 116 may include a scorer 118 which calculates the overall score 108 for the requested advisor. In order to generate the overall score, the scorer 118 uses data relevant to the three categories of core factors (i.e., qualifications and expertise; communication, flexibility and performance; incentives, independence and ethics). In some embodiments, the scorer may be configured such that the first and second categories each have a weight of 30% and the third category has a weight of 40%, as shown in FIG. 2. In other embodiments, the scorer 118 may be arranged to provide a different set of weights for the categories of core factors.

The scorer 118 retrieves data relevant to the second category of core factors (communication, flexibility and performance) from one or more sources. One source may be the user making the initial query request 102. Upon requesting the overall score for a particular advisor, the server 116 utilizes an interface 124 to prompt the user as to whether the user has met the advisor. If the user has met the requested advisor, the scorer 118 obtains Category Two data 110 from the user, wherein such data may pertain to the advisor's diligence, ability to empathize, flexibility, work ethic, responsiveness, follow-up, ability to work within a team structure, organizational skills, overall positive outlook, and/or other "soft skill" factors. For one or more of these factors, the server 116 may prompt the user to rate the advisor on a scale of 1 to 5 points (1 being poor and 5 being excellent) or a scale of 1 to 10 points (1 being poor and 10 being excellent). The scorer 118 compiles the rating data and stores it in a storage 126. The storage 126 may be an internal component of the server(s) 116 or connected directly to the server(s) 116. Alternatively, the storage 126 may be connected to the server(s) 116 over a network (e.g., Internet, local area network, wide area network, metropolitan area network, etc.).

The scorer 118 may also retrieve Category Two data which was previously provided by other users and saved in the storage 126. Such data from other users similarly includes ratings of the advisor with respect to diligence, ability to empathize, flexibility, work ethic, responsiveness, follow-up, ability to work within a team structure, organizational skills, overall positive outlook, and/or other "soft skill" factors. The scorer 118 thereafter calculates an average user feedback rating based on the Category Two data from the requesting user and the Category Two data from other users. If the requesting user, however, has not yet met the requested advisor, the scorer 118 will calculate the average user feedback rating based only on Category Two data of other users.

In some embodiments, the scorer 118 may search the storage 126 to retrieve data relevant to the first category of core factors (qualifications and expertise) and the third category of core factors (incentives, independence and ethics) for the requested advisor, if available. That is, the ratings corresponding to the first and third categories may have been previously calculated for the particular advisor during a prior request and saved in the storage 126. The scorer 118 would accordingly obtain the ratings for Category One and Category Three from storage 126.

If the storage 126, however, does not have a Category One rating or a Category Three rating for the requested advisor, the user may request that these two ratings be determined. The server(s) 116 would transmit a request 140 to an independent analyst to research the background and history of the requested advisor and provide the category ratings 144. In particular, upon receiving the research request 140 at the analyst computer 142, the analyst would review the advisor's background using information from publicly-available regulatory and industry databases 128. As shown in FIG. 1, the regulatory and industry databases 128 may be connected to the server(s) 116. In this embodiment, the server(s) 116 retrieve the background information for the requested advisor and forwards the information to the analyst computer 142. The independent analyst, in turn, gains access to the background history of the advisor through the server(s) 116. In other embodiments, there is a connection between the analyst computer 142 and the regulatory and industry databases 128. As such, the independent analyst gains direct access to the advisor's background history without the intermediate connection of the server(s) 116.

With respect to Category One factors, the analyst computer 142 evaluates the advisor's education level, credentials within his/her respective fields, and the amount of experience (e.g., years of experience) the advisor has. Up to 10 points, for example, may be earned per year of experience. Up to 10 points may also be earned for the highest and most respected credentials voluntarily obtained by the advisor in the advisor's field. Finally, 5 points are rewarded for an undergraduate education and another 5 points are rewarded for a relevant graduate degree earned by the advisor. Thus, the range for the Category One rating may be between 1 and 30 points, which corresponds to the 30% weight with which the first category has in the overall rating score.

The analyst computer 142 evaluates the advisor's disciplinary and ethics history to determine the Category Three rating, which carries the heaviest weight in the overall rating score 108 compared to Categories One and Two. The increased weight of the Category Three core factors is grounded on the theory that the other categories are useless if the advisor's advice is tainted with conflicts of interest and self-interest. The analyst computer 142 may assign up to 20 points for the advisor's lack of ethical violations and/or avoidance of disciplinary actions by an applicable regulatory body. Further, up to 20 points may be assigned for the advisor's association and participation in a structure (e.g., group, society, firm, company, etc.) that does not accept commission from third parties and that does not have a financial interest in the outcome of advice. Thus, the range for the Category Three rating may be between 1 and 40 points, which corresponds to the 40% weight with which the third category has in the overall rating score.

Once the analyst has determined the ratings 144 for Category One and Category Three core factors, the ratings are transmitted from the analyst computer 142 to the server(s) 116 and saved into storage 126. At this point, the scorer 118 calculates the overall rating score 108 based on the individual ratings for the three categories of core factors. For example, the overall rating score 108 may be a sum of the three category ratings, wherein the Category One rating can have a maximum of 30 points, the Category Two rating can have a maximum of 30 points, and the Category Three rating can have a maximum of 40 points. Thus, the highest overall rating score that an advisor can receive is 100 points. In some embodiments, the overall rating score may be calculated using another method, such as a weighted average method, wherein the higher the score, the better the advisor is. Once the overall rating score 108 has been calculated, it is transmitted to the user computer 100 and displayed via the interface 124. Further, the overall rating score 108 and the date the score is calculated are saved in storage 126. With this information saved, a time history of the advisor's overall score may be tracked.

The server(s) 116 may also include a comparer 119. The comparer 119 performs comparative analysis of the requested advisor's overall rating score relative to the scores of other advisors. The comparer 119 provide more detailed information with respect to how the requested advisor measures against a standard and against other advisors. As shown in FIG. 1, the comparer 119 generates score comparison information 106, which is transmitted to the user computer 100. The score comparison information 106 may include the individual rating values for each category of core factors. Such information may be helpful in determining the advisor's strengths and weakness. For example, even though an advisor may have a high Category One rating and a high Category Two rating, their significance may be diminished by a low Category Three rating, which may signify that the advisor does not provide impartial advice as a result of self-interest. In some embodiments, the score comparison information 106 may include the overall rating scores of other advisors (for example, advisors located in the same geographic area as the requested advisor) and provide a comparative analysis between the requested advisor's scores and the scores of the other advisors.

In some embodiments, the server(s) 116 may provide the requesting user with Category Two user feedback ratings given by other users for the particular advisor. As such, the requesting user can browse through the experiences that other users have had with the particular advisor. For example, the requesting user may see how others have judged the advisor with respect to diligence, ability to empathize, flexibility, work ethic, responsiveness, willingness to follow-up, ability to work within a team structure, organizational skills and/or overall positive outlook.

The system or tool according to the present teachings may also provide information on the requested advisor's fees for services rendered. Such information may be collected by the server(s) 116 from all users who access the system and have employed the advisor. Alternatively, or in addition thereto, information on the requested advisor's fees may be determined by an independent analyst at the analyst computer 142. The information on advisor fees may be saved into the storage 126. In some embodiments, an average of advisor fees may be calculated. Alternatively, or in addition thereto, the fee information may be broken down based on specific types of services rendered. The server(s) 116 may be configured to also provide fee information of other advisors to form a basis with which to compare the requested advisor's fees.

The comparisons of overall rating score and fees may include filtering and/or sorting on different demographics. This way, the user can compare the requested advisor relative to similar advisors. As will be appreciated by one skilled in the art, demographics can include any number of factors, such as gender, race (e.g., ethnicity), age, and geographic location, although not limited thereto.

The server(s) 116 may include an interface 124. The interface 124 allows the user to interact with the system and may include a website 104. The interface 124 may include an application for a mobile device, although not limited thereto. The interface 124 may also provide for interaction with independent, third-party analysts. For example, if data concerning first and third categories of core factors is needed by the scorer 118, the server(s) 116 sends a request 140 to the analyst at the analyst computer 142 via the interface 124.

The server(s) 116 may include a reporter 122. The reporter 122 may provide a detailed report, documenting the requested advisor's overall rating score as well as any of the above mentioned data/information. This detailed report may be transmitted from the server(s) 116 to the user computer 100 for immediate display and/or as an attachment in an email. As discussed further below with reference to FIGS. 4A-4B, the reporter may include a spreadsheet-based interface that allows both reporting as well as the collection of information from the user.

The system or tool according to the present teachings may be configured so that the server(s) 116 include a certifier 120. The certifier 120 provides security and control features to prevent a competitor of an advisor from connecting to the server(s) 116 from a computer 130 and inputting adverse Category Two data and user experience data 132. One such control will be a prompt on the website 104 that requires the user to certify that he or she is not a competitor of the advisor and did in fact employ the advisor. In some embodiments, the certifier 120 will request that the user enter in one or more identification numbers (e.g., social security number, employer identification number, driver's license number, etc.) in order to certify that the he or she is not a competitor. As shown in FIG. 1, the certifier 120 stops the computer 130 from connecting to the server(s) 116 at the website 104. That is, a competitor of an advisor would not get past the website 104 and would fail to gain access to the server(s) 116.

In addition, the certifier 120 may provide security and control features to prevent an advisor from connecting to the server(s) 116 from a computer 130 and inputting positive Category Two data 132 in attempt to improve his or her own overall rating score.

In some embodiments, the interface 124 and/or certifier 120 regulate who can access to the server(s) 116 and who can make a request 102 based on login credentials. For example, the system or tool may be configured so that a user would only have to pay for requesting a first review of an advisor (subsequent requests are free). Upon logging in with appropriate credentials at the website 104, the interface 124 and/or certifier 120 may check to see if the account associated with the credentials has provided a payment and how many requests 102 have been made by the user. If necessary, the certifier 120 communicates via the interface 124 to display a prompt on website 104 to request a payment. As another example, the system or tool may be configured so that a user would have to pay a periodic subscription (e.g., monthly, yearly, seasonal) before making any requests for advisor review. In this case, the interface 124 and/or certifier 120 would check the account associated with the user's login credentials and see if the user's subscription is up-to-date, has been renewed, or has expired. If the user has a valid subscription, he or she can proceed with making a request 102. However, if the user's subscription has expired, the certifier 120 would send a prompt via the interface 124 to website 104 requesting payment. In yet another example, the system or tool may be configured so that a subscription is based on the number of requests for advisor scores. If the subscription allows for 10 requests for example, the interface 124 and/or certifier 120 would look at the user's account to see if he or she has reached the request limit. If so, the interface 124 and/or certifier 120 would prompt the user to renew his or her subscription and provide payment.

Figure 3:
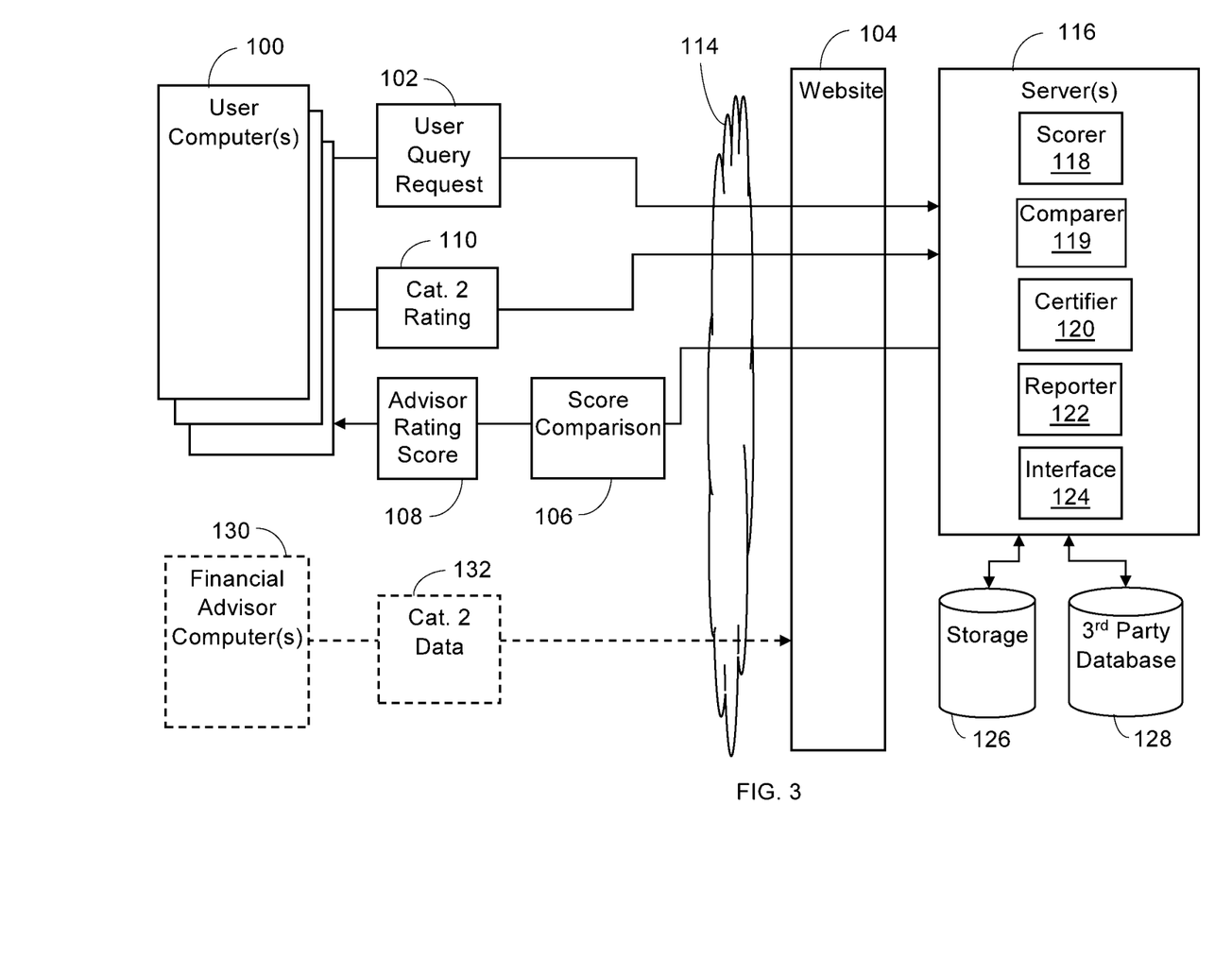
FIG. 3 is a schematic diagram of another embodiment of the system and method according to the present teachings.

Referring now to FIG. 3, shown is a schematic diagram of another embodiment of the system or tool according to the present teachings. The system or tool of FIG. 3 has many of the same components and functions as the system or tool of FIG. 1. The system of FIG. 3 does not include an analyst computer 142 connected to the server(s) 116 and does not involve an independent analyst reviewing the requested advisor's background upon receipt of an on-demand request 140. Instead, Category One ratings and Category Three ratings have been determined for each advisor and stored in the storage 126 and/or database 128. When a user at user computer 100 initiates a request 102 for an advisor, the scorer 118 searches through one or both of storage 126 and database 128 for Category One, Category Two and Category Three ratings that are linked to the requested advisor. The scorer 118 retrieves all three category ratings and calculates an overall rating score 108 based on the three category ratings. Thereafter, the server(s) 116 transmits the overall rating score 108 and score comparison information 106 to the user computer 100 via interface 124 for display to the user.

Figure 4A:
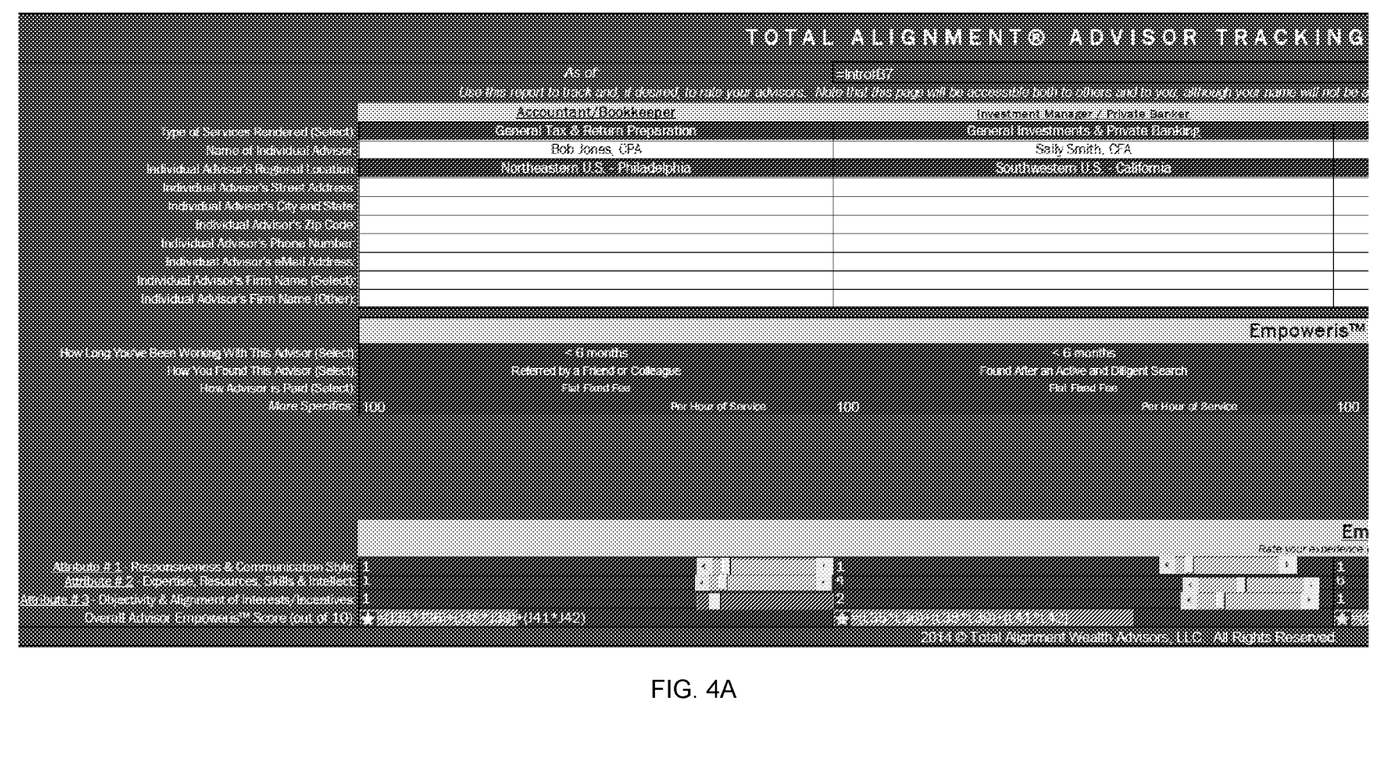
FIG. 4A-4B are exemplary screenshots according to the system and method of FIG. 1.
Figure 4B:
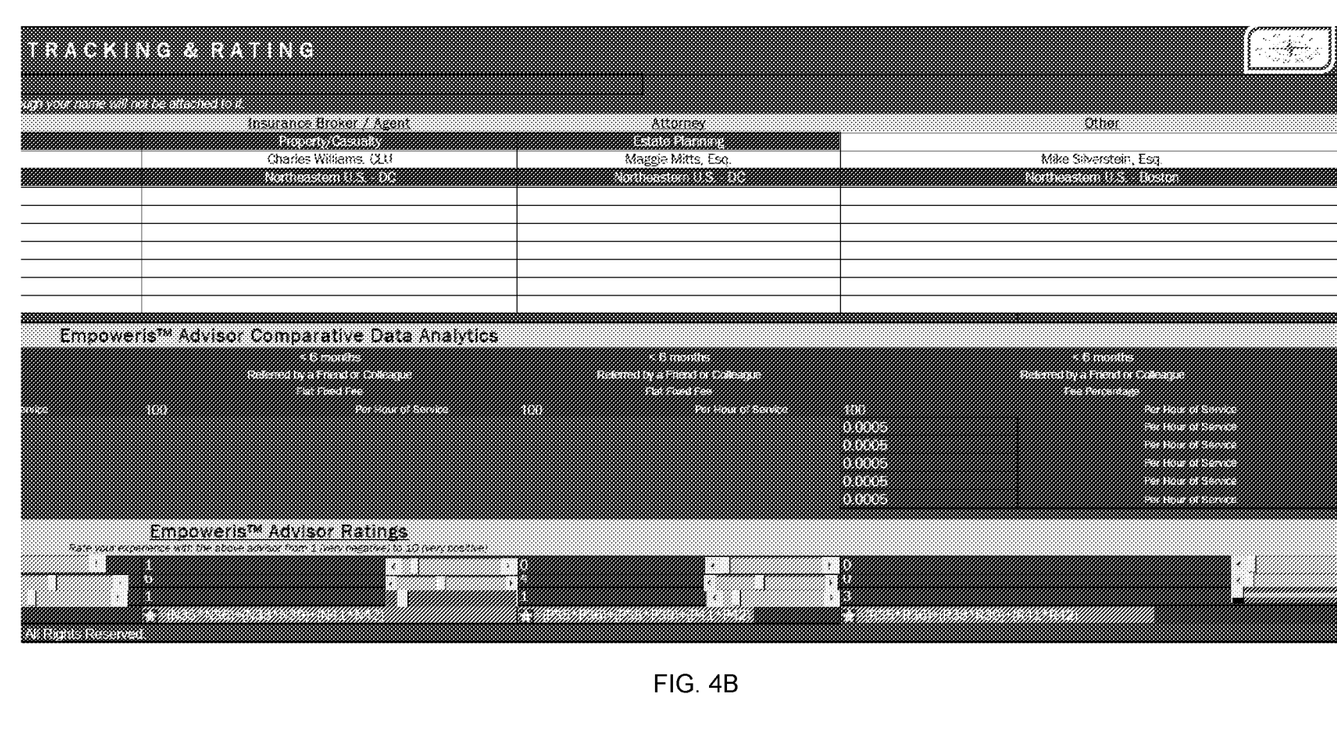

Referring now to FIGS. 4A-4B, shown are exemplary screenshots according to the system of FIGS. 1 and 3. In one embodiment, reporting may be in the form of a spreadsheet interface. Analytics may include formulae defined in spreadsheets that are populated with data provided by the user and/or independent analysts. This may provide flexible, on-demand response based on manual inputs and data imports, using a series of hyperlinks, macro buttons, charts and formulas (e.g., algorithms), although not limited thereto.

The user has the ability to enter data manually. The inputs that the user may manually input may include the user's experience with an advisor, and more specifically, data concerning Category Two core factors (communication, flexibility and performance).

FIGS. 4A-4B depict a screenshot of an output provided by the server(s) 116 in response to a request 102. The output may include the overall rating score 108 for the requested advisor, ratings for each of the categories of core factors for the requested advisor, rating/score comparisons 106 between the requested advisor and other advisors. Contact information for the requested advisor and the other advisors may also be displayed. As will be appreciated by one skilled in the art, prior art systems do not allow such ratings of advisors.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for providing direct-to-consumer analysis and rating of a financial advisor, the method comprising the steps of:

providing a storage;

providing a website in electronic communication with a server;

allowing a plurality of users at user terminals access to the system only if they have paid for a subscription to the system;

retrieving via the server a first rating, a second rating, and a third rating upon receiving a search request for an advisor from one of the plurality of users at one of the user terminals, the first rating quantifying the advisor's qualifications and expertise based on at least objective scores given for (i) years of experience as a financial advisor, (ii) achieving the highest and most rigorous voluntary credential in the respective field of the financial advisor, and (iii) education degrees that were received by the financial advisor, the second rating quantifying the advisor's communication, work flexibility and performance skills based on at least subjective scores given by user feedback ratings, the third rating quantifying the advisor's ethics and independence from conflicts based on at least objective scores given for (i) records indicating a lack of disciplinary history by the regulatory body of the respective field of the financial advisor, and (ii) the financial advisor being part of a structure that does not accept commissions from third parties, and does not have a financial interest in the outcome of advice provided by the financial advisor;

storing the first rating, second rating and third rating in said storage;

using a scorer to calculate an overall rating score for said advisor based on said first rating, second rating, and third rating;

wherein the step of using the scorer to calculate the overall rating score includes: assigning individual weights to each of the first rating, second rating and third rating, the individual weights representing the importance of the respective rating in calculating the overall rating score;

transmitting the overall rating score from the scorer to the storage to be saved;

displaying the overall rating score to said one of the plurality of users on said one of the user terminals after being allowed access to the system, and using a certifier configured to use security and control features to prevent access to the server by the advisor or by competitors of the advisor, wherein the access is prevented by prompting the user to certify that they are not a competitor of the advisor and did in fact employ the advisor or prompting the user to enter one or more identification numbers in order to certify that they are not a competitor, thereby preventing the advisor or competitors of the advisor from influencing the second rating by entering positive or adverse user feedback data.

2. The method of claim 1, wherein the step of assigning individual weights includes setting the individual weight of the third rating to be greater than the individual weight of the first rating and the individual weight of the second rating, the greater weight of the third rating characterizing an importance of the advisor's ethics and the advisor being free of conflicts of interest and self-interest.

3. The method of claim 1, wherein the second rating is determined based on average user feedback ratings, and wherein the server is configured to obtain input data on user experience from said one of the plurality of users when said one of the plurality of users has met the advisor, wherein said input data is used to generate said average user feedback ratings and is saved in said storage.

4. The method of claim 1, wherein the first rating and the third rating is retrieved from said storage if available; and
wherein the server is configured to transmit a signal to an analyst computer requesting independent review of the advisor's background and determination of the first rating and the third rating when the first rating and the third rating have not been previously established and saved in said storage.

5. A direct-to-consumer financial advisor rating system, comprising:
a storage;
a website in electronic communication with a server;
the server having:
an interface including computer instructions executing on computer hardware, the interface only allowing a plurality of users at user terminals access to the system when they have paid for a subscription to the system;
a scorer including computer instructions executing on computer hardware, the scorer retrieving a first rating, a second rating, and a third rating upon receiving a search request for an advisor from one of the plurality of users at one of the user terminals,
the first rating quantifying the advisor's qualifications and expertise based on at least objective scores given for (i) years of experience as a financial advisor, (ii) achieving the highest and most rigorous voluntary credential in the respective field of the financial advisor, and (iii) education degrees that were received by the financial advisor,
the second rating quantifying the advisor's communication, work flexibility and performance skills based on at least subjective scores given by user feedback ratings,
the third rating quantifying the advisor's ethics and independence from conflicts based on at least objective scores given for (i) records indicating a lack of disciplinary history by the regulatory body of the respective field of the financial advisor, and (ii) the financial advisor being part of a structure that does not accept commissions from third parties, and does not have a financial interest in the outcome of advice provided by the financial advisor;
the scorer using the first, second and third ratings to calculate an overall rating score for the advisor, the overall rating score shown as a single number and representing a comprehensive analysis of a quality of the advisor, the overall rating score providing a measure with which to benchmark the advisor against other advisors;
wherein the scorer is configured to assign each of the first rating, second rating, and third rating with individual weights, said individual weights representing the importance of the respective rating in calculating the overall rating score;
the scorer transmitting said overall rating score to said storage to be saved;
the website displaying the overall rating score to said one of the plurality of users on said one of the user terminals after being allowed access to the system by the interface,
the server further having a certifier configured to use security and control features to prevent access to the server by the advisor or by competitors of the advisor, wherein the access is prevented by prompting the user to certify that they are not a competitor of the advisor and did in fact employ the advisor or prompting the user to enter one or more identification numbers in order to certify that they are not a competitor, thereby preventing the advisor or competitors of the advisor from influencing the second rating by entering positive or adverse user feedback data.

6. The system of claim 5, wherein the weight of the first rating is 30%, the weight of the second rating is 30%, and the weight of the third rating is 40%.

7. The system of claim 5, wherein the weight of the third rating is greater than the weight of the first rating and the weight of the second rating, the greater weight of the third rating characterizing an importance of the advisor's ethics and the advisor being free of conflicts of interest and self-interest.

8. The system of claim 5, wherein the second rating is determined based on average user feedback ratings.

9. The system of claim 8, wherein the server is configured to obtain input data on user experience from said one of the plurality of users when said one of the plurality of users has met the advisor, wherein said input data is used to generate said average user feedback ratings and is saved in said storage.

10. The system of claim 5, wherein said scorer is configured to obtain the first rating and the third rating from said storage when available.

11. The system of claim 10, wherein the server is configured to transmit a signal to an analyst computer requesting independent review of the advisor's background and determination of the first rating and the third rating when the first rating and the third rating have not been previously established and saved in said storage.

12. The system of claim 11, the analyst computer is connected to at least one regulatory or industry database to retrieve information on the advisor's background.

13. The system of claim 5, wherein the server further comprises a comparer, said comparer performing comparative analysis of the advisor's overall rating score relative to overall rating scores of other advisors, the website displaying the comparative analysis on said one of the user terminals, said storage saving the comparative analysis.

14. The system of claim 13, wherein the comparative analysis, which is displayed on said one of the user terminals, includes the first rating, the second rating and the third rating as well as input data on user experience provided by other users for said advisor.

15. The system of claim 13, wherein the server is configured to compile service fee information of said advisor, said comparer generating a fee comparison comparing the service fee information of said advisor with the service fee information of other advisors, the website displaying the fee comparison on said one of the user terminals.

* * * * *